(12) United States Patent
Sample et al.

(10) Patent No.: US 8,024,318 B2
(45) Date of Patent: Sep. 20, 2011

(54) SYSTEM AND METHOD FOR AUTOMATED DISCOVERY, BINDING, AND INTEGRATION OF NON-REGISTERED GEOSPATIAL WEB SERVICES

(75) Inventors: John T. Sample, Pearl River, LA (US); Lev I Shulman, New Orleans, LA (US); Frank P McCreedy, Diamondhead, MS (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 12/627,073

(22) Filed: Nov. 30, 2009

(65) Prior Publication Data
US 2010/0088308 A1 Apr. 8, 2010

Related U.S. Application Data

(62) Division of application No. 11/753,389, filed on May 24, 2007, now Pat. No. 7,685,133.

(60) Provisional application No. 60/809,991, filed on May 24, 2006.

(51) Int. Cl.
*G06F 17/30* (2006.01)
(52) U.S. Cl. .......................... 707/709; 707/919; 707/921
(58) Field of Classification Search .................. 707/709, 707/919, 921
See application file for complete search history.

(56) References Cited

U.S. PATENT DOCUMENTS

| | | | |
|---|---|---|---|
| 7,353,114 B1 * | 4/2008 | Rohlf et al. ....................... 702/5 |
| 7,386,517 B1 | 6/2008 | Donner | |
| 7,523,191 B1 | 4/2009 | Thomas et al. | |
| 2004/0117358 A1 * | 6/2004 | von Kaenel et al. .............. 707/3 |
| 2008/0124202 A1 | 5/2008 | Chu et al. | |
| 2008/0214204 A1 * | 9/2008 | Ramer et al. ............... 455/456.1 |

OTHER PUBLICATIONS

Sayar et al., OGC Compatible Geogrphical Information Systems Web Services, 2006, pp. 1-64.*
Di et al., The Integration of Grid Technology with OGC Web Services (OWS) in NWGISS for NASA EOS Data, pp. 1-10.*
Doyle et al., OGC Data Service Catalog, 2001, pp. 1-9.*
Raskin, R., "Guide to Making Your Data Products WMS-Compliant: A Tutorial for Data Providers", 2001, [online], [retrieved on May 21, 2007], <http://oceanesip.jpl.nasa.gov/esipde/guide1.0.html>.
Brentjens, Thijs; "Open GIS Web Feature Service for editing cadastral data", Apr. 2004, pp. 1-120.
Sara Robinson, The Ongoing Search for Efficient Web Search Algorithms, *SIAM News*, vol. 37, No. 9, Nov. 2004.

(Continued)

*Primary Examiner* — Leslie Wong
(74) *Attorney, Agent, or Firm* — Amy I. Ressing; Kathleen Chapman

(57) ABSTRACT

A method and computer system for identifying internet web pages containing documents that comply with a predetermined XML schema. The method includes searching the internet with a search engine for web pages using initial search terms and identifying a first set of HTTP URLs, web crawling at least the first set of HTTP URLs to identify additional HTTP URLs, appending a query to the identified URLs, and evaluating the responses to the query to determine which responses comply with the predetermined XML schema. The XML schema can be a Web Mapping Services schema. The system can store responses that comply with the XML schema in a database of servers, periodically check the database for validity, and convert the map requests for map servers in the database to a GIDB Portal Interface API.

8 Claims, 14 Drawing Sheets

OTHER PUBLICATIONS

Wishard, L., Precision Among Internet Search Engines: An Earth Sciences Case Study, *Issues in Science and Technology Librarianship*, Spring 1998, http://www.library.ucsb.edu/istl/98-spring/article5.html.

Douglas Nebert, Arliss Whiteside, OGC™ Catalogue Services Specification, Open Geospatial Consortium Inc., May 20, 2005, Reference No. OGC 04-021r3, Version: 2.0.0 with Corregendum, http://www.opengeospatial.org/standards/deprecated.

* cited by examiner

```
<!ELEMENT WMT_MS_Capabilities (Service, Capability) >

<!ATTLIST WMT_MS_Capabilities
         version CDATA #FIXED "1.1.1"
         updateSequence CDATA #IMPLIED>

<!-- Elements used in multiple places. -->

<!-- The Name is typically for machine-to-machine communication. -->
<!ELEMENT Name (#PCDATA) >

<!-- The Title is for informative display to a human. -->
<!ELEMENT Title (#PCDATA) >

<!-- The abstract is a longer narrative description of an object. -->
<!ELEMENT Abstract (#PCDATA) >

<!-- An OnlineResource is typically an HTTP URL.  The URL is placed in
the
xlink:href attribute.  The xmlns:xlink attribute is a required XML
namespace
declaration. -->
<!ELEMENT OnlineResource EMPTY>
<!ATTLIST OnlineResource
         xmlns:xlink CDATA #FIXED "http://www.w3.org/1999/xlink"
         xlink:type CDATA #FIXED "simple"
         xlink:href CDATA #REQUIRED >

<!-- A container for listing an available format's MIME type. -->
<!ELEMENT Format (#PCDATA) >

<!-- General service metadata. -->

<!ELEMENT Service (Name, Title, Abstract?, KeywordList?,
OnlineResource, ContactInformation?, Fees?, AccessConstraints?) >

<!-- List of keywords or keyword phrases to help catalog searching. -->
<!ELEMENT KeywordList (Keyword*) >

<!-- A single keyword or phrase. -->
<!ELEMENT Keyword (#PCDATA) >

<!-- Information about a contact person for the service. -->
<!ELEMENT ContactInformation  (ContactPersonPrimary?, ContactPosition?,
                               ContactAddress?, ContactVoiceTelephone?,
                               ContactFacsimileTelephone?,
                               ContactElectronicMailAddress?) >
```

FIG. 3A

```
<!--The primary contact person.-->
<!ELEMENT ContactPersonPrimary (ContactPerson, ContactOrganization) >

<!--The person to contact.-->
<!ELEMENT ContactPerson (#PCDATA) >

<!--The organization supplying the service.-->
<!ELEMENT ContactOrganization (#PCDATA) >

<!--The position title for the contact person.-->
<!ELEMENT ContactPosition (#PCDATA) >

<!--The address for the contact supplying the service.-->
<!ELEMENT ContactAddress
(AddressType,Address,City,StateOrProvince,PostCode,
          Country) >

<!--The type of address.-->
<!ELEMENT AddressType (#PCDATA) >

<!--The street address.-->
<!ELEMENT Address (#PCDATA) >

<!--The address city.-->
<!ELEMENT City (#PCDATA) >

<!--The state or province.-->
<!ELEMENT StateOrProvince (#PCDATA) >

<!--The zip or postal code.-->
<!ELEMENT PostCode (#PCDATA) >

<!--The address country.-->
<!ELEMENT Country (#PCDATA) >

<!--Contact telephone number.-->
<!ELEMENT ContactVoiceTelephone (#PCDATA) >

<!--The contact fax number.-->
<!ELEMENT ContactFacsimileTelephone (#PCDATA) >

<!--The e-mail address for the contact.-->
<!ELEMENT ContactElectronicMailAddress (#PCDATA) >

<!-- Elements indicating what fees or access constraints are imposed. -->
<!ELEMENT Fees (#PCDATA)>
<!ELEMENT AccessConstraints (#PCDATA)>
```

FIG. 3B

```
<!-- A Capability lists available request types, how exceptions
may be reported, and whether any vendor-specific capabilities are
defined.  It also includes an optional list of map layers available
from this server. -->
<!ELEMENT Capability
          (Request, Exception, VendorSpecificCapabilities?,
           UserDefinedSymbolization?, Layer?) >

<!-- Available WMS Operations are listed in a Request element. -->
<!ELEMENT Request (GetCapabilities, GetMap, GetFeatureInfo?,
                   DescribeLayer?, GetLegendGraphic?, GetStyles?,
PutStyles?) >

<!-- For each operation offered by the server, list the available
output formats and the online resource. -->
<!ELEMENT GetCapabilities (Format+, DCPType+)>
<!ELEMENT GetMap (Format+, DCPType+)>
<!ELEMENT GetFeatureInfo (Format+, DCPType+)>
<!-- The following optional operations only apply to SLD-enabled WMS --
>
<!ELEMENT DescribeLayer (Format+, DCPType+)>
<!ELEMENT GetLegendGraphic (Format+, DCPType+)>
<!ELEMENT GetStyles (Format+, DCPType+)>
<!ELEMENT PutStyles (Format+, DCPType+)>

<!-- Available Distributed Computing Platforms (DCPs) are
listed here.  At present, only HTTP is defined. -->
<!ELEMENT DCPType (HTTP) >

<!-- Available HTTP request methods.  One or both may be supported. -->
<!ELEMENT HTTP (Get | Post)+ >

<!-- URL prefix for each HTTP request method. -->
<!ELEMENT Get (OnlineResource) >
<!ELEMENT Post (OnlineResource) >

<!-- An Exception element indicates which error-reporting formats are
supported. -->
<!ELEMENT Exception (Format+)>

<!-- Optional user-defined symbolization (used only by SLD-enabled
WMSes). -->
<!ELEMENT UserDefinedSymbolization EMPTY >
<!ATTLIST UserDefinedSymbolization
          SupportSLD (0 | 1) "0"
          UserLayer (0 | 1) "0"
          UserStyle (0 | 1) "0"
          RemoteWFS (0 | 1) "0" >
```

FIG. 3C

```
<!-- Nested list of zero or more map Layers offered by this server. -->
<!ELEMENT Layer ( Name?, Title, Abstract?, KeywordList?, SRS*,
                  LatLonBoundingBox?, BoundingBox*, Dimension*, Extent*,
                  Attribution?, AuthorityURL*, Identifier*,
                  MetadataURL*, DataURL*, FeatureListURL*, Style*,
                  ScaleHint?, Layer* ) >

<!-- Optional attributes-->
<!ATTLIST Layer queryable (0 | 1) "0"
                cascaded CDATA #IMPLIED
                opaque (0 | 1) "0"
                noSubsets (0 | 1) "0"
                fixedWidth CDATA #IMPLIED
                fixedHeight CDATA #IMPLIED >

<!-- Identifier for a single Spatial Reference Systems (SRS). -->
<!ELEMENT SRS (#PCDATA) >

<!-- The LatLonBoundingBox attributes indicate the edges of the
enclosing rectangle in latitude/longitude decimal degrees (as in SRS
EPSG:4326 [WGS1984 lat/lon]). -->
<!ELEMENT LatLonBoundingBox EMPTY>
<!ATTLIST LatLonBoundingBox
          minx CDATA #REQUIRED
          miny CDATA #REQUIRED
          maxx CDATA #REQUIRED
          maxy CDATA #REQUIRED>

<!-- The BoundingBox attributes indicate the edges of the bounding box
in units of the specified spatial reference system. -->
<!ELEMENT BoundingBox EMPTY>
<!ATTLIST BoundingBox
          SRS CDATA #REQUIRED
          minx CDATA #REQUIRED
          miny CDATA #REQUIRED
          maxx CDATA #REQUIRED
          maxy CDATA #REQUIRED
          resx CDATA #IMPLIED
          resy CDATA #IMPLIED>

<!-- The Dimension element declares the _existence_ of a dimension. -->
<!ELEMENT Dimension EMPTY >
<!ATTLIST Dimension
          name CDATA #REQUIRED
          units CDATA #REQUIRED
          unitSymbol CDATA #IMPLIED>

<!-- The Extent element indicates what _values_ along a dimension are
valid. -->
<!ELEMENT Extent (#PCDATA) >
```

FIG. 3D

```
<!ATTLIST Extent
        name CDATA #REQUIRED
        default CDATA #IMPLIED
        nearestValue (0 | 1) "0"
        multipleValues (0 | 1) "0"
        current (0 | 1) "0">
```

<!-- Attribution indicates the provider of a Layer or collection of
Layers. The provider's URL, descriptive title string, and/or logo image
URL may be supplied.  Client applications may choose to display one or
more of these items.  A format element indicates the MIME type of the
logo image located at LogoURL.  The logo image's width and height
assist client applications in laying out space to display the logo. -->
```
<!ELEMENT Attribution ( Title?, OnlineResource?, LogoURL? )>
<!ELEMENT LogoURL (Format, OnlineResource) >
<!ATTLIST LogoURL
        width NMTOKEN #REQUIRED
        height NMTOKEN #REQUIRED>
```

<!-- A Map Server may use zero or more MetadataURL elements to offer
detailed, standardized metadata about the data underneath a particular
layer. The type attribute indicates the standard to which the metadata
complies.  Two types are defined at present: 'TC211' = ISO TC211 19115;
'FGDC' = FGDC CSDGM.  The format element indicates how the metadata is
structured. -->

```
<!ELEMENT MetadataURL (Format, OnlineResource) >
<!ATTLIST MetadataURL
        type ( TC211 | FGDC ) #REQUIRED>
```

<!-- A Map Server may use zero or more Identifier elements to list ID
numbers or labels defined by a particular Authority.  For example, the
Global Change Master Directory (gcmd.gsfc.nasa.gov) defines a DIF ID
label for every dataset.  The authority name and explanatory URL are
defined in a separate AuthorityURL element, which may be defined once
and inherited by subsidiary layers.  Identifiers themselves are not
inherited. -->

```
<!ELEMENT AuthorityURL (OnlineResource) >
<!ATTLIST AuthorityURL
        name NMTOKEN #REQUIRED >
<!ELEMENT Identifier (#PCDATA) >
<!ATTLIST Identifier
        authority CDATA #REQUIRED >
```

<!-- A Map Server may use DataURL to offer more information about the
data underneath a particular layer. While the semantics are not well-
defined, as long as the results of an HTTP GET request against the

FIG. 3E

```
DataURL are properly MIME-typed, Viewer Clients and Cascading Map
Servers can make use of this. -->
<!ELEMENT DataURL (Format, OnlineResource) >

<!-- A Map Server may use FeatureListURL to point to a list of the
features represented in a Layer. -->
<!ELEMENT FeatureListURL (Format, OnlineResource) >

<!-- A Style element lists the name by which a style is requested and a
human-readable title for pick lists, optionally (and ideally) provides
a human-readable description, and optionally gives a style URL. -->
<!ELEMENT Style ( Name, Title, Abstract?,
                  LegendURL*, StyleSheetURL?, StyleURL? ) >

<!-- A Map Server may use zero or more LegendURL elements to provide an
image(s) of a legend relevant to each Style of a Layer.  The Format
element indicates the MIME type of the legend. Width and height
attributes are provided to assist client applications in laying out
space to display the legend. -->

<!ELEMENT LegendURL (Format, OnlineResource) >
<!ATTLIST LegendURL
         width NMTOKEN #REQUIRED
         height NMTOKEN #REQUIRED>

<!-- StyleSheeetURL provides symbology information foreach Style of a
Layer. -->
<!ELEMENT StyleSheetURL (Format, OnlineResource) >

<!-- A Map Server may use StyleURL to offer more information about the
data or symbology underlying a particular Style. While the semantics
are not well-defined, as long as the results of an HTTP GET request
against the StyleURL are properly MIME-typed, Viewer Clients and
Cascading Map Servers can make use of this. A possible use could be to
allow a Map Server to provide legend information. -->
<!ELEMENT StyleURL (Format, OnlineResource) >

<!-- Minimum and maximum scale hints for which it is appropriate to
display this layer. -->
<!ELEMENT ScaleHint EMPTY>
<!ATTLIST ScaleHint
         min CDATA #REQUIRED
         max CDATA #REQUIRED>
```

FIG. 3F

```
<!ELEMENT WMT_MS_Capabilities (Service, Capability) >

<!ATTLIST WMT_MS_Capabilities
        version CDATA #FIXED "1.1.1"
        updateSequence CDATA #IMPLIED>

<!-- Elements used in multiple places. -->

<!-- The Name is typically for machine-to-machine communication. -->
<!ELEMENT Name (#PCDATA) >

<!-- The Title is for informative display to a human. -->
<!ELEMENT Title (#PCDATA) >

<!-- The abstract is a longer narrative description of an object. -->
<!ELEMENT Abstract (#PCDATA) >

<!-- An OnlineResource is typically an HTTP URL.  The URL is placed in
the xlink:href attribute.  The xmlns:xlink attribute is a required XML
namespace declaration. -->
<!ELEMENT OnlineResource EMPTY>
<!ATTLIST OnlineResource
        xmlns:xlink CDATA #FIXED "http://www.w3.org/1999/xlink"
        xlink:type CDATA #FIXED "simple"
        xlink:href CDATA #REQUIRED >

<!-- A container for listing an available format's MIME type. -->
<!ELEMENT Format (#PCDATA) >

<!-- General service metadata. -->

<!ELEMENT Service (Name, Title, Abstract?, KeywordList?,
OnlineResource, ContactInformation?, Fees?, AccessConstraints?) >

<!-- List of keywords or keyword phrases to help catalog searching. -->
<!ELEMENT KeywordList (Keyword*) >

<!-- A single keyword or phrase. -->
<!ELEMENT Keyword (#PCDATA) >

<!-- Information about a contact person for the service. -->
<!ELEMENT ContactInformation  (ContactPersonPrimary?, ContactPosition?,
                               ContactAddress?, ContactVoiceTelephone?,
                               ContactFacsimileTelephone?,
                               ContactElectronicMailAddress?) >
<!--The primary contact person.-->
```

FIG. 4A

```
<!ELEMENT ContactPersonPrimary (ContactPerson, ContactOrganization) >

<!--The person to contact.-->
<!ELEMENT ContactPerson (#PCDATA) >

<!--The organization supplying the service.-->
<!ELEMENT ContactOrganization (#PCDATA) >

<!--The position title for the contact person.-->
<!ELEMENT ContactPosition (#PCDATA) >

<!--The address for the contact supplying the service.-->
<!ELEMENT ContactAddress
(AddressType,Address,City,StateOrProvince,PostCode, Country) >

<!--The type of address.-->
<!ELEMENT AddressType (#PCDATA) >

<!--The street address.-->
<!ELEMENT Address (#PCDATA) >

<!--The address city.-->
<!ELEMENT City (#PCDATA) >

<!--The state or province.-->
<!ELEMENT StateOrProvince (#PCDATA) >

<!--The zip or postal code.-->
<!ELEMENT PostCode (#PCDATA) >

<!--The address country.-->
<!ELEMENT Country (#PCDATA) >

<!--Contact telephone number.-->
<!ELEMENT ContactVoiceTelephone (#PCDATA) >

<!--The contact fax number.-->
<!ELEMENT ContactFacsimileTelephone (#PCDATA) >

<!--The e-mail address for the contact.-->
<!ELEMENT ContactElectronicMailAddress (#PCDATA) >

<!-- Elements indicating what fees or access constraints are imposed. -
->
<!ELEMENT Fees (#PCDATA)>
<!ELEMENT AccessConstraints (#PCDATA)>
```

FIG. 4B

```
<!-- A Capability lists available request types, how exceptions may be
reported, and whether any vendor-specific capabilities are defined.  It
also includes an optional list of map layers available from this
server. -->
<!ELEMENT Capability
         (Request, Exception, VendorSpecificCapabilities?,
          UserDefinedSymbolization?, Layer?) >

<!-- Available WMS Operations are listed in a Request element. -->
<!ELEMENT Request (GetCapabilities, GetMap, GetFeatureInfo?,
                   DescribeLayer?, GetLegendGraphic?, GetStyles?,
                   PutStyles?) >

<!-- For each operation offered by the server, list the available
output formats and the online resource. -->
<!ELEMENT GetCapabilities (Format+, DCPType+)>
<!ELEMENT GetMap (Format+, DCPType+)>
<!ELEMENT GetFeatureInfo (Format+, DCPType+)>
<!-- The following optional operations only apply to SLD-enabled WMS --
>
<!ELEMENT DescribeLayer (Format+, DCPType+)>
<!ELEMENT GetLegendGraphic (Format+, DCPType+)>
<!ELEMENT GetStyles (Format+, DCPType+)>
<!ELEMENT PutStyles (Format+, DCPType+)>

<!-- Available Distributed Computing Platforms (DCPs) are
listed here.  At present, only HTTP is defined. -->
<!ELEMENT DCPType (HTTP) >

<!-- Available HTTP request methods.  One or both may be supported. -->
<!ELEMENT HTTP (Get | Post)+ >

<!-- URL prefix for each HTTP request method. -->
<!ELEMENT Get (OnlineResource) >
<!ELEMENT Post (OnlineResource) >

<!-- An Exception element indicates which error-reporting formats are
supported. -->
<!ELEMENT Exception (Format+)>

<!-- Optional user-defined symbolization (used only by SLD-enabled
WMSes). -->
<!ELEMENT UserDefinedSymbolization EMPTY >
<!ATTLIST UserDefinedSymbolization
         SupportSLD (0 | 1) "0"
         UserLayer  (0 | 1) "0"
         UserStyle  (0 | 1) "0"
         RemoteWFS  (0 | 1) "0" >
```

FIG. 4C

```
<!-- Nested list of zero or more map Layers offered by this server. -->
<!ELEMENT Layer ( Name?, Title, Abstract?, KeywordList?, SRS*,
                  LatLonBoundingBox?, BoundingBox*, Dimension*,
                  Extent*, Attribution?, AuthorityURL*, Identifier*,
                  MetadataURL*, DataURL*, FeatureListURL*, Style*,
                  ScaleHint?, Layer* ) >
<!-- Optional attributes-->
<!ATTLIST Layer queryable (0 | 1) "0"
                cascaded CDATA #IMPLIED
                opaque (0 | 1) "0"
                noSubsets (0 | 1) "0"
                fixedWidth CDATA #IMPLIED
                fixedHeight CDATA #IMPLIED >

<!-- Identifier for a single Spatial Reference Systems (SRS). -->
<!ELEMENT SRS (#PCDATA) >

<!-- The LatLonBoundingBox attributes indicate the edges of the
enclosing rectangle in latitude/longitude decimal degrees (as in SRS
EPSG:4326 [WGS1984 lat/lon]). -->
<!ELEMENT LatLonBoundingBox EMPTY>
<!ATTLIST LatLonBoundingBox
        minx CDATA #REQUIRED
        miny CDATA #REQUIRED
        maxx CDATA #REQUIRED
        maxy CDATA #REQUIRED>

<!-- The BoundingBox attributes indicate the edges of the bounding box
in units of the specified spatial reference system. -->
<!ELEMENT BoundingBox EMPTY>
<!ATTLIST BoundingBox
        SRS CDATA #REQUIRED
        minx CDATA #REQUIRED
        miny CDATA #REQUIRED
        maxx CDATA #REQUIRED
        maxy CDATA #REQUIRED
        resx CDATA #IMPLIED
        resy CDATA #IMPLIED>

<!-- The Dimension element declares the _existence_ of a dimension. -->
<!ELEMENT Dimension EMPTY >
<!ATTLIST Dimension
        name CDATA #REQUIRED
        units CDATA #REQUIRED
        unitSymbol CDATA #IMPLIED>
```

FIG. 4D

```
<!-- The Extent element indicates what _values_ along a dimension are
valid. -->
<!ELEMENT Extent (#PCDATA) >
<!ATTLIST Extent
        name CDATA #REQUIRED
        default CDATA #IMPLIED
        nearestValue (0 | 1) "0"
        multipleValues (0 | 1) "0"
        current (0 | 1) "0">

<!-- Attribution indicates the provider of a Layer or collection of
Layers. The provider's URL, descriptive title string, and/or logo image
URL may be supplied.  Client applications may choose to display one or
more of these items.  A format element indicates the MIME type of the
logo image located at LogoURL.  The logo image's width and height
assist client applications in laying out space to display the logo. -->
<!ELEMENT Attribution ( Title?, OnlineResource?, LogoURL? )>
<!ELEMENT LogoURL (Format, OnlineResource) >
<!ATTLIST LogoURL
        width NMTOKEN #REQUIRED
        height NMTOKEN #REQUIRED>

<!-- A Map Server may use zero or more MetadataURL elements to offer
detailed, standardized metadata about the data underneath a particular
layer. The type attribute indicates the standard to which the metadata
complies.  Two types are defined at present: 'TC211' = ISO TC211 19115;
'FGDC' = FGDC CSDGM.  The format element indicates how the metadata is
structured. -->
<!ELEMENT MetadataURL (Format, OnlineResource) >
<!ATTLIST MetadataURL
        type ( TC211 | FGDC ) #REQUIRED>

<!-- A Map Server may use zero or more Identifier elements to list ID
numbers
or labels defined by a particular Authority.  For example, the Global
Change Master Directory (gcmd.gsfc.nasa.gov) defines a DIF_ID label for
every dataset.  The authority name and explanatory URL are defined in a
separate AuthorityURL element, which may be defined once and inherited
by subsidiary layers.  Identifiers themselves are not inherited. -->

<!ELEMENT AuthorityURL (OnlineResource) >
<!ATTLIST AuthorityURL
        name NMTOKEN #REQUIRED >
<!ELEMENT Identifier (#PCDATA) >
<!ATTLIST Identifier
        authority CDATA #REQUIRED >
```

FIG. 4E

```
<!-- A Map Server may use DataURL to offer more information about the
data underneath a particular layer. While the semantics are not well-
defined, as long as the results of an HTTP GET request against the
DataURL are properly MIME-typed, Viewer Clients and Cascading Map
Servers can make use of this. -->
<!ELEMENT DataURL (Format, OnlineResource) >

<!-- A Map Server may use FeatureListURL to point to a list of the
features represented in a Layer. -->
<!ELEMENT FeatureListURL (Format, OnlineResource) >

<!-- A Style element lists the name by which a style is requested and a
human-readable title for pick lists, optionally (and ideally) provides
a human-readable description, and optionally gives a style URL. -->
<!ELEMENT Style ( Name, Title, Abstract?,
                  LegendURL*, StyleSheetURL?, StyleURL? ) >

<!-- A Map Server may use zero or more LegendURL elements to provide an
image(s) of a legend relevant to each Style of a Layer. The Format
element indicates the MIME type of the legend. Width and height
attributes are provided to assist client applications in laying out
space to display the legend. -->
<!ELEMENT LegendURL (Format, OnlineResource) >
<!ATTLIST LegendURL
          width NMTOKEN #REQUIRED
          height NMTOKEN #REQUIRED>

<!-- StyleSheeetURL provides symbology information foreach Style of a
Layer. -->
<!ELEMENT StyleSheetURL (Format, OnlineResource) >

<!-- A Map Server may use StyleURL to offer more information about the
data or symbology underlying a particular Style. While the semantics
are not well-defined, as long as the results of an HTTP GET request
against the StyleURL are properly MIME-typed, Viewer Clients and
Cascading Map Servers can make use of this. A possible use could be to
allow a Map Server to provide legend information. -->
<!ELEMENT StyleURL (Format, OnlineResource) >

<!-- Minimum and maximum scale hints for which it is appropriate to
display this layer. -->
<!ELEMENT ScaleHint EMPTY>
<!ATTLIST ScaleHint
          min CDATA #REQUIRED
          max CDATA #REQUIRED>
```

FIG. 4F

SYSTEM AND METHOD FOR AUTOMATED DISCOVERY, BINDING, AND INTEGRATION OF NON-REGISTERED GEOSPATIAL WEB SERVICES

CROSS-REFERENCE TO RELATED APPLICATIONS

This Application is a divisional application of U.S. Pat. No. 7,685,133, issued on Mar. 23, 2010, which is a nonprovisional application of provisional application 60/809,991 filed on May 24, 2006 under 35 USC 119(e). The entire disclosures of these applications are incorporated herein by reference.

FIELD OF THE INVENTION

This invention is generally related to the field of computer network searches, and more particularly, to geospatial portals for identifying and providing geospatial map information available through the internet to remote users.

BACKGROUND OF THE INVENTION

Worldwide governmental and commercial entities continue to make more geospatial data available on the internet. The Open Geospatial Consortium (OGC) provides public specifications for a variety of geospatial web services such as Web Mapping Service, Web Feature Service, and Web Coverage Service. Web Mapping Services (WMS) are those services that interface client applications with server applications to provide a map image.

While the number of available WMS servers on the web has been growing steadily, searching for new WMS sources is often reduced to simply using an Internet search engine (e.g., GOOGLE™ or a similar search engine) to find WMS servers on the Internet.

The Open Geospatial Consortium has provided a number of public standards for geospatial web services, which have grown substantially in popularity and use over the past several years. However, while some client and server applications adhere to the OCG standards, the process for searching for OGC web services on the web is still mostly done manually. There have been attempts to automate the discovery process. For example, Refractions Research provides an online service at <http://www.refractions.net> for conducting an automated OGC web services survey using the Google APIs to search for WMS "Capabilities" documents by including strings such as "url:REQUEST=GetCapabilities" in the Google API search query. The Google API query returns found URLs of this form that are then processed to verify whether a URL returns a valid OGC web service "Capabilities" document.

A web mapping services server is most often advertised by a typical HTTP URL such as http://www.wmsServerHost.com/path?. Requests to the WMS server are constructed by configuring key-value pairs in the query part of the URL. For example, a URL of the form http://www.wmsServerHost.com/path?REQUEST=GetCapabilities&SERVICE=WMS can return an XML "Capabilities" document that adheres to a WMS "Capabilities" schema as published by the Open Geospatial Consortium. A "Capabilities" document is analogous to a web service definition file in the WSDLISOAP web service model (W3C. 2001) and describes the map layers that the WMS server provides, along with the WMS server's contact info and metadata. A WMS client retrieves and scans this document to issue map requests for map layers featured within the document.

A number of WMS client applications provide a variety of mapping capabilities such as zoom in/out, map image transparency, and layering by configuring the HTTP key-value pairs according to user actions. OGC Web Mapping Service Capabilities documents validate to a common XML Schema published by the Open Geospatial Consortium, for example, the current XML schema W3C.2004. Programming to a common standard interface allows for a great amount of interoperability between WMS client and server implementations.

A map can be fetched from a WMS server by typing a WMS URL request in an internet browser to retrieve the map image. An example of a WMS URL request is <http://dmap.nrlssc.navy.mil/ogcwms/servlet/WMSServlet/GIDBImageServer.wms?Request=GetMap&SERVICE=WMS&Layers=NASA_BLUE&BBOX=-180.-90.0,180.0, 90.0&WIDTH=800&HEIGHT=600&FORMAT=image/png>. This WMS URL request fetches a NASA Blue Marble PNG map image of 800 pixels width and 600 pixel height and geographic region of (-180,90,180,90). The WMS server host is <dmap.nrlssc.navy.mil>, and the URL path is </ogcwms/servlet/GIDBImageServer.wms?>. The query part of the URL is: <Request=GetMap&SERVICE=WMS&Layers=NASA_BLUE&BBOX=-180.-90.0,180.0, 90.0&WIDTH=800&HEIGHT=600&FORMAT=image/png>. The various map request parameters in the query part of this URL are HTTP key-value pairs that specify the geometric bounding box of the map image (e.g., pixel width and height).

As discussed previously, manually searching for new WMS systems can be accomplished by using an internet search engine (e.g., the GOOGLE™ search engine) to find WMS servers on the internet. In addition, Refractions Research (www.refractions.net) provides the ability to conduct an automated OGC web services survey using the Google search engine APIs to search for WMS "Capabilities" documents by including strings such as "url:REQUEST=GetCapabilities" in the Google API search query, then retrieving a "Capabilities" document by constructing a URL of the form: <http://wmsServerHost/path?REQUEST=GetCapabilities>. The search engine API query returns found URLs of this form that can then be processed to verify whether a URL returns a valid OGC Web Service "Capabilities" document. A recent Refractions Research OGC Web Services Survey has found over 1000 WMS Capabilities URLs.

WMS servers are sometimes advertised on the internet with a query within the URL string "REQUEST=GetCapabilities&SERVICE=WMS", e.g., <http://wmsServerHost/path?REQUEST=GetCapabilities&SERVICE=WMS", or with the WMS server URL but without the query term, e.g., <http://wmsServerHost/path> without the "REQUEST=GetCapabilities&SERVICE=WMS" appended. If a website hosts a spreadsheet or xml listing of WMS Servers advertised with only the WMS Server URL, Servers that conduct a search with a <http://wmsServerHost/path?REQUEST=GetCapabilities> query will be unable to find the website, for there is no URL pattern substring pattern to take advantage of.

BRIEF SUMMARY OF THE INVENTION

An embodiment of the invention is directed to a computer-based method for identifying internet web pages containing documents that comply with a predetermined XML schema. The method includes searching the internet with a search engine for web pages using initial search terms and identifying a first set of HTTP URLs, web crawling at least the first set of HTTP URLs to identify additional HTTP URLs, appending a query to the identified URLs; and evaluating the responses to the query to determine which responses comply with the predetermined XML schema, and storing the HTTP URLs responses that comply with the predetermined XML schema in a database. In one embodiment, the predetermined XML schema is a schema published by the Open Geospatial Consortium.

The method can also include adding the HTTP URLs responses that comply with the predetermined XML schema to a database of available servers.

The method can also include selecting URLs of the first set of HTTP URLs that are a document type that is unlikely to contain more HTTP URLs, and not web crawling the selected URLs. The selected URLs can be are at least one of music files, image files, and executable files.

The method can also include comparing a newly discovered document against previously known WMS server documents to avoid duplication, and web crawling the HTTP URLS in the database periodically to discover non-operational links. The method can also include web crawling a predetermined set of additional web sites, for example, GIS web sites.

In an embodiment of the invention, the appended query requests a Web Mapping Services Capabilities document, for example, by appending ?REQUEST=GetCapabilities&SERVICE=WMS.

The method can also include converting map requests for at least one particular map server in the database to a GIDB Portal Interface API.

An embodiment of the invention is directed to a system and computer-based method for providing a single point of access to geospatial information system web services. The method includes periodically searching the internet with an internet search algorithm, and determining whether a web service is valid by engaging the web services in a query-response interchange. The method can also include storing the valid web service in a list of available web services.

The method can also include a geospatial portal receiving a map request from a remote computer; the geospatial portal transferring documents to the remote computer from the stored list of valid web services. The documents appear to the remote computer user to come from a single service.

In this method, the sources of information or web services which return a valid response are themselves considered valid and added to the list of sources available to users.

BRIEF DESCRIPTION OF THE DRAWINGS

FIG. 3 is an example of a Web Mapping Services XML Schema against which documents are validated in a method according to an embodiment of the invention.

FIG. 4 is an example of an XML document for validating against the XML Schema in accordance with an embodiment of the invention.

DETAILED DESCRIPTION OF THE INVENTION

Figure 1:
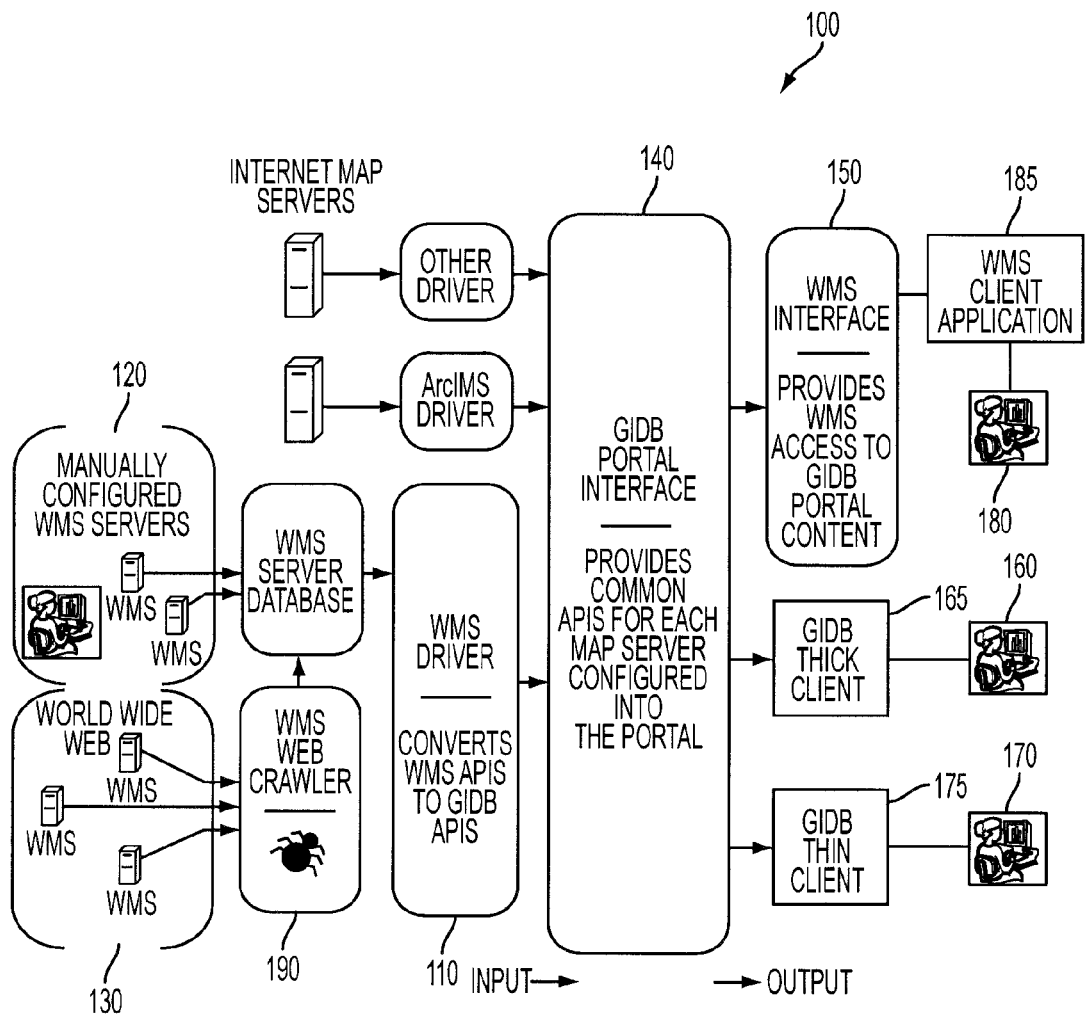
FIG. 1 illustrates web based portal system for automatically discovering and binding web mapping services that adhere to a standard interface specification, and integrating the services into a portal interface, according to an embodiment of the invention.

FIG. 1 illustrates a web based portal system for automatically discovering and binding web mapping services that adhere to a standard interface specification, and integrating the services into a portal interface. The system takes advantage of the standard interface specification by programming one WMS client to drive WMS requests from any published WMS server configured into the portal. The system can broker access to hundreds of thousands of maps from over a thousand various internet map servers such as NASA Blue Marble server, ArcIMS, Satellite Imagery servers, or WMS servers.

The web based portal system provides the user access all of the map servers through a single mapping application. Because the map servers can have many different implementations and access formats, drivers are programmed to convert map requests for a particular map server to the GIDB Portal Interface API. A major of using the GIDB Portal to access maps online are the copious amount of maps the Portal brokers, and homogeneous access to a variety of heterogeneous map servers via the GIDB Portal Interface APIs and the GIDB thick/thin mapping application clients. In contrast, the various map servers typically include client applications specifically designed to work with only the particular type of map server.

FIG. 1 illustrates the system architecture of a web mapping portal system 100 with automated capabilities to discover, bind, and integrate non-registered geospatial web services according to an embodiment of the invention.

Users 160, 170, and 180 can connect to the GIDB Portal interface 140 via a thick client application 165 resident on their computer, a web-based thin client application 175 via their computer or personal digital assistant, or through another client application 185.

The Portal WMS Driver component 110 converts GIDB Portal map requests to WMS map requests, which are in turn relayed to various WMS servers brokered by the GIDB Portal. For each map server brokered by the GIDB Portal, a driver 110 is used to convert a GIDB Portal map request to the particular map server request. The GIDB WMS Driver 110 converts GIDB Portal map requests to WMS Server Map requests by constructing the appropriate WMS URLs.

The GIDB WMS driver 110 essentially acts as a WMS client that reads the "Capabilities" document of WMS servers 120, 130 that have been configured into the GIDB Portal, and based on the contents of the Capabilities document advertises the particular WMS Server's map content to the GIDB Portal user. As the user 160 selects to view a particular map layer, a GIDB Portal fetch map request is issued and processed into a WMS fetch map request to the selected WMS Server. The only piece of information that is needed for the WMS driver 110 to configure a WMS Server into the GIDB Portal is the WMS Server URL as described above. Communication from the WMS Driver to the WMS Server is performed by configuring HTTP query key value pairs to the corresponding WMS Server URL and fetching the HTTP response.

As depicted in FIG. 1, the GIDB Portal system provides the user 160, 170, or 180 with access to map content from various map servers from a single client application. With any WMS compliant client application, the user may also access GIDB Portal content through the GIDB WMS Interface that adheres to the latest accepted version of the WMS specifications. With all of the benefits that web services technology brings such as interoperability, platform independence, and a standard API, any of the original map sources configured into the GIDB Portal are brokered access via WMS in a fully automated manner. In addition, a WMS server that is configured into the GIDB Portal as input may adhere to WMS specifications Version 1.0.0, but will be provided access via WMS Version 1.1.1 from the GIDB WMS Interface as output. This system design provides programmatic access that is highly interoperable and platform independent to a considerable amount of web map content that may come from platform dependent internet map sources that have little interoperability with other applications.

The integration of the GIDB Portal Interface 140, the GIDB WMS Driver 110, the WMS Web Crawler 190 and the GIDB WMS Interface components 150 of the system described above represent a portal that brokers homogeneous access to a variety of WMS Servers. By configuring as many WMS Servers as available on the Web into the WMS Driver component, the system saves the user the work of searching for WMS Servers manually and provides access to a vast array of WMS content from one comprehensive mapping application.

Figure 2:
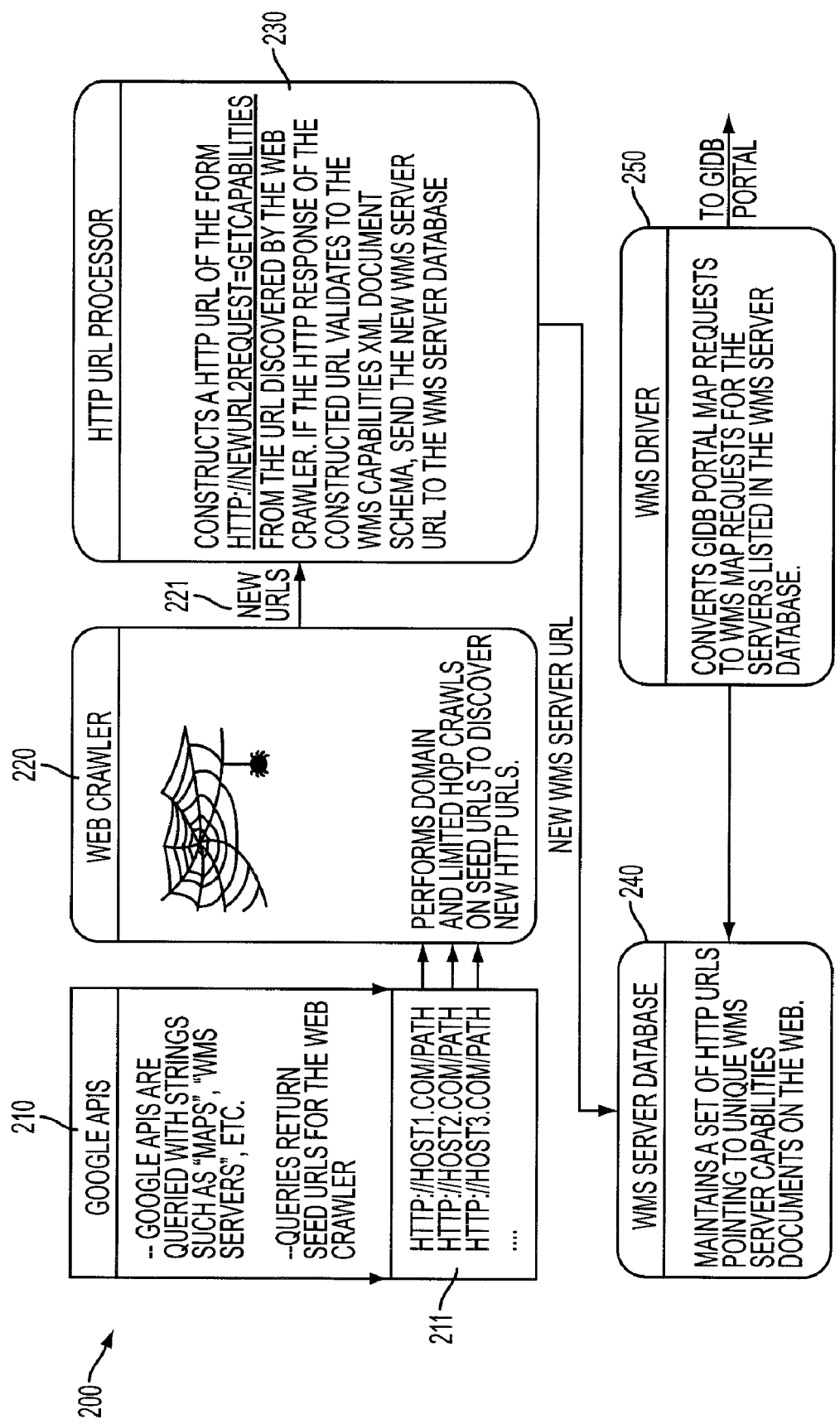
FIG. 2 illustrates more details of the system of FIG. 1.

In an embodiment of the invention illustrated in FIG. 2, an automated method and system automatically searches for XML documents published on the web that validate to a common Open Geospatial Consortium Web Mapping Services XML Schema. More generally, the method and system can search for XML documents that validate to a particular XML schema, and is suitable for many different Web Services related applications.

WMS servers each have a published XML document that validates to a common XML schema as published by the Open Geospatial Consortium. The current WMS specification is available at J. Beaujardiere, Web Map Service Implementation Specifications, Version 1.1.1, Jan. 2; <http://portal.opengeospatial.org/files/index.php?artifact_id=1080&version=1&format=pdf>. An example of a WMS server published XML document that validates to the OGC WMS specification is: <http://digitalearth.gov/wmt/xml/capabilities__1__1__1.dtd>

WMS map requests can be issued to any HTTP URL by appending "REQUEST=GetCapabilities&SERVICE=WMS" to the URL. The HTTP response body returns a validated OGC WMS Capabilities Document.

Initially, the automated system searches 210 the internet using an internet search engine for HTTP URLs 211 that potentially include WMS Servers or links to WMS Servers. Many WMS servers have a common implementation, and may have common URL string patterns in the corresponding WMS server URLs. The search terms can be keywords such as "map", "WMS Servers" "WMS maps", "Map server", "REQUEST=GetCapabilities", "OpenGIS Web Services", and other terms and URL string patterns common to WMS servers.

In an exemplary embodiment of the invention, a search engine application program interface (API) is included in the system's computer program, so internet searches can be executed with little user input other than identifying the search terms for the search string. The APIs can be those provided by Google, Inc., Yahoo, Inc., or other search engines. The GOOGLE™ API specifications are described at <http://www.google.com/apis/reference.htms>. Thus, the search engine APIs can be used to dramatically reduce the set of all HTTP URLs to retrieve URLs as input seeds to the WMS crawler.

While APIs can be used to reduce the time and manpower needed to conduct an internet search and can store the results in a readily usable format, it is also possible to type queries into the internet search engines directly.

Once the initial web search has identified HTTP URLs, the system uses a web crawler 220 to search the URLs returned by the internet search for additional http URLs. The web crawler can find http URLs that are listed on the web pages identified by the original search that may not have been indexed by the search engine. By utilizing web crawling, the system can crawl scores of URLs to find WMS Capabilities Documents, and improve upon the original search. In one embodiment, the system employs the scalable and highly configurable Heritrix Open Source Web Crawler <http://archive.crawler.org>, although other web crawlers are also suitable. The crawler is fed seed URLs from GOOGLE™ API queries with keywords similar to what a human user would input to a search engine to find WMS map servers: keywords like "WMS Maps", "OpenGIS Web Services", etc., as discussed above.

WMS Servers are often advertised on websites within well known "GIS web domains" that are of common interest within the geospatial information systems (GIS) community. The web crawler 220 can also be programmed to crawl these websites in addition to crawling the set of HTTP URLs 211 returned by the initial web search.

The system can also configure the webcrawler to disregard any URLs that return MIME header types that are images, video streams, music, executable programs, etc. that indicate that the URL is unlikely to contain another URL. These URLs will not be downloaded and processed.

The system includes a HTTP URL processor 230 that constructs a HTTP URL by appending a query designed to return only documents having a valid XML Schema. In the particular embodiment concerned with OCG WMS documents, the processor 230 constructs HTTP URL queries determine whether the discovered HTTP URLs are WMS Capabilities XML Documents that validate to the OGC WMS Specification XML Schema. The system tests whether the any discovered HTTP URL response returns a valid WMS "Capabilities" document. If a valid WMS "Capabilities" document is returned, then that HTTP URL is identified as a useful WMS document, and the system will be able to issue WMS map requests to the discovered URL based on the document's contents, and configure the new WMS Server URL into the GIDB Portal System WMS Driver automatically.

As an example, the processor 230 can append key-value pairs "REQUEST=GetCapabilities&SERVICE=WMS" to every HTTP URL within the set of all accessible HTTP URLs on the web. Appending such a query string to all the HTTP URLs within the set of all accessible HTTP URLs on the web can find all of the published WMS servers on the web. Exhaustively crawling the web (without the aid of a search engine) for WMS Server URLs is not feasible. Accordingly, the processor 230 appends the query string to only the HTTP URLs discovered by the web search and the web crawler search.

To target Internet areas likely to contain useful information, crawl jobs can also be configured to crawl particular GIS related web domains. This is an automated approach similar to a human user browsing www.esri.com or www.opengis.org to find WMS Services. To save on download time, only URLs with MIME types that contain text schemas XML, HTML, etc. can be downloaded. The downloaded HTTP response body is processed to extract more HTTP URLs to validate to a WMS Capabilities schema. If a HTTP URL is not of a type that may contain other URLs, such as video or music, then the crawler is configured to disregard the download.

The processor 230 uses an XML parser to validate each of the returned documents as conforming to the predetermined XML schema. As an example, FIG. 3 is an WMS XML Schema available at <http://digitalearth.gov/wmt/xml/capabilities__1__1__1.dtd>. An example of a returned document to be validated is shown in FIG. 4, an XML document available at the internet site <http://columbo.nrlssc.navy.mil/ogcwms/servlet/WMSServlet/Alexander_County_NC_Maps.wms?SERVICE=WMS&REQUEST=GetCapabilities>.

If a discovered URL validates, it is stored in a database 240 that the WMS Driver component checks periodically for new findings. Because different WMS URLs can point to a WMS Server offering the same map content, the newly discovered WMS Server's Capabilities XML document tree is tested for equivalence against previously discovered WMS Servers to avoid duplicates within the Portal. As the WMS Driver 250 makes the new WMS Server known to the GIDB Portal, the portal's size grows by the amount of map content available in the server. By feeding the web crawler URL seeds from GOOGLE™ APIs, queries of the form "url: REQUEST=GetCapabilities" should retrieve at least as many discovered WMS Servers as a Refractions Research OGC Web Services Survey.

WMS Server Database 240 maintains a set of HTTP URLs pointing to the unique WMS server capabilities documents on the web for future use by the WMS driver 250. The system periodically re-validates the HTTP URLs stored in the WMS Server Database, and periodically conducts new searches for new WMS Server HTTP URLs. The search would typically be carried out once a week, although it can be done more or less frequently.

The GIDB portal system described herein configures the new WMS Server URL into the GIDB Portal System WMS Driver automatically. The described portal system provides potential users a single access point to all of the services discovered by the search algorithm (identifying a first set of HTTP URLs, webcrawling the first set of URLs to identify other URLs, querying the URLs to find which URLs contain files that comply with the WMS XML schema. This allows users to search, connect and retrieve data from the services all from one point, with all the WMS files being accessible to the user through the GIDB portal system and appearing to come from the single source of the GIDB portal. This is a significant savings of time and energy.

The web service interface to this portal also makes available a highly interoperable and platform independent programmatic access to sources that may have little platform independence and are not compatible with other GIS applications. The larger the number of sources integrated into a web portal, the greater its value is as a service.

Previously, searches and discovery of new sources of mapping information have been done manually by using search engines and catalogs. The system described herein provides a scalable automated solution. By utilizing a topic driven web crawler configured to search for structured XML documents that validate to a public schema, the system of integrated components presents a fully automated means for search, discovery, binding, and integration of Geospatial Web Services, thereby reducing the cost and manual labor needed to search for and configure new Geospatial Web Services into the portal.

The system presented is implemented in the platform-independent Java programming language and designed with a modular and scalable approach. While the system process of discovering new services is catered towards Geospatial Web Services, the same approach can be employed to other Web Services that are advertised by an XML document that validates to a common XML Schema.

In addition to being stored for future retrieval, the list of valid URLs and the query and responses from the URLs can also be printed, transferred to a remote computer, and displayed to a local or remote user.

Embodiments of the invention are also directed to computer based systems, methods, and computer readable media for controlling the computer components and accomplishing the methods described herein.

Users at remote sites have computers or PDAs for selecting WMS data sources from the GIDB portal system, and using the thick client or thin client GIDB software, can assemble maps with overlaid different layers of data, and can store, print, display, modify, and transfer the resulting maps, layers, and map data to other users. The software can also be integrated into other local ore remote computer systems for automatic retrieval of map data and integration of the resulting maps or map data into computer databases or systems.

The invention has been described with reference to certain preferred embodiments. It will be understood, however, that the invention is not limited to the preferred embodiments discussed above, and that modification and variations are possible within the scope of the appended claims.

What is claimed as new and desired to be protected by Letters Patent of the United States is:

1. A computer-based method for providing a single point of access to geospatial information system web services, comprising:
    providing a single point of access to geospatial information system web services including the steps of:
        automatically periodically performing a general, non-directory, non-catalog search, by computer software stored on a non-transitory computer-readable medium, of the internet with an internet search algorithm and URL string patterns that identify WMS services for HTTP URLs that include WMS Servers or links to WMS Servers;
        determining whether a web service found by the internet search algorithm is valid by automatically engaging, by the computer software stored on the non-transitory computer-readable medium, the web service in a query-response interchange; and
        storing the valid web service in a list of available web services.

2. The method of claim 1, further comprising:
    receiving, by a geospatial portal, a map request from a remote computer; and
    transferring documents on the stored list of valid web services from the geospatial portal to the remote computer.

3. The method according to claim 2, wherein the transferred documents appear to the remote computer user to come from a single service.

4. The method according to claim 1, further comprising:
    designating sources of information or web services which return a valid response as valid; and
    adding the valid sources of information or web services to the list of sources available to users.

5. A computer-based system for providing a single point of access to geospatial information system web services comprising:
    a server connected to the internet and having software for providing a single point of access to geospatial information system web services, the software stored on non-transitory computer readable media having instructions configured to:
        automatically periodically perform a general, non-directory, non-catalog search of the internet with an internet search algorithm and URL string patterns that identify WMS services;
        automatically determine whether a web service is valid by engaging the web service in a query-response interchange; and automatically store the valid web service in a list of available web services.

6. The system of claim 5, further comprising:
a geospatial portal configured to receive a map request from a remote computer and to transfer documents to the remote computer from the stored list of valid web services.

7. The system according to claim 6, wherein the transferred documents appear to the remote computer user to come from a single service.

8. The system according to claim 5, the instructions further configured to:
designate sources of information or web services which return a valid response as valid and add the sources of information or web services to the list of sources available to users.

\* \* \* \* \*